ised Patent [11] 3,610,339

| [72] | Inventor | Robert R. Harvey |
| | | Bartlesville, Okla. |
| [21] | Appl. No. | 799,180 |
| [22] | Filed | Feb. 14, 1969 |
| [45] | Patented | Oct. 5, 1971 |
| [73] | Assignee | Phillips Petroleum Company |

[54] SURFACTANT MIXTURE IN WATERFLOODING
6 Claims, 3 Drawing Figs.

[52] U.S. Cl. .............................................. 166/274,
166/275, 252/8.55 D
[51] Int. Cl. .............................................. E21b 43/22
[50] Field of Search ................................ 166/273–275;
252/8.55 D

[56] References Cited
UNITED STATES PATENTS
3,170,514  2/1965  Harvey et al. ................ 166/275

| 3,373,808 | 3/1968 | Patton | 166/275 |
| 3,373,809 | 3/1968 | Cooke | 166/273 |
| 3,401,748 | 9/1968 | Stratton | 166/275 X |
| 3,407,877 | 10/1968 | Harvey et al. | 166/274 |
| 3,421,582 | 1/1969 | Fallgatter | 166/273 |
| 3,437,141 | 4/1969 | Brandner et al. | 166/273 |
| 3,456,732 | 7/1969 | Stratton | 166/274 |
| 3,476,187 | 11/1969 | Harvey | 166/275 X |
| 3,455,386 | 7/1969 | Reisberg | 166/275 |

Primary Examiner—Ian A. Calvert
Attorney—Young and Quigg

ABSTRACT: A method for recovering oil from a formation by injecting an aqueous solution containing two surfactants which are ethylene oxide adducts of alkyl phenols, one surfactant being a solubilizing agent for the other, into that formation; an aqueous liquid containing a viscosifying agent maybe injected behind the surfactant solution.

INVENTOR.
R. R. HARVEY

SURFACTANT MIXTURE IN WATERFLOODING

This invention relates to an improved method for recovering oil from an oil-bearing stratum. In one aspect this invention relates to an improved additive for use in waterflood fluids.

The use of surfactants in an aqueous liquid to provide a favorable mobility ratio between the displacing fluid and the displaced fluid is well known. In practice, a bank containing the surfactant is initially injected in a water input well, followed by the injection of untreated water. The surfactant operates as a thickening agent having the effect of increasing the viscosity of the aqueous bank. Ideally, the displacing fluid exhibits a mobility equal to, or greater than, that of the formation fluids being displaced, giving a mobility ratio equal to, or less than, unity. By definition, the mobility ratio may be represented as:

$$M = \frac{\text{mobility of displacing fluid}}{\text{mobility of displaced fluid}} = \frac{k_1 u_2}{k_2 u_1}$$

where:

$k_1$ is the formation relative permeability to the displacing fluid;

$k_2$ is the formation relative permeability to the displaced fluid; $u_1$ is the viscosity of displacing fluid; and $u_2$ is the viscosity of the displaced fluid.

For a favorable mobility ratio, that is, one which is equal to or less than one, the areal displacement efficiency of the flooding medium is generally high. On the other hand, when the mobility ratio is low, the areal displacement efficiency is low resulting in low recoveries due to the strong tendency of the displacing fluid to finger or channel through the displaced fluid.

Since the mobility of the displacing fluid (water) is low relative to the mobility of the displaced fluid (oil) in the conventional waterflood system, additives have been employed to increase the water viscosity and thereby improve the mobility ratio. Such additives include a wide variety of commercially available surface active agents which, in addition to their effects on the water viscosity, preferentially wet the reservoir rock thereby adding to the sweep efficiency of the flood medium.

Because of economics, mobility control is generally effected by injecting a bank or slug of water containing the additive and following the bank with brine or untreated water. The system then includes an oil phase, an additive bank and a brink phase. This technique provides for a favorable mobility ratio of additive bank to the oil phase. However, the brine phase now bears the same or worse relationship to the additive bank as it formerly did to the oil phase. As between the brine phase and additive bank, the former is the displacing fluid and the latter, the displaced fluid. Since $u_2$ is greater than $u_1$, the mobility ratio of the two fluids is unfavorable. Thus the additives which provide for a favorable mobility ratio as between the oil phase and the additive bank create an unfavorable mobility ratio as between the additive bank and the brine phase. In such a system, the brine tends to finger or channel through the additive bank.

The purpose of the present invention is to provide a mobility control in a flooding system for all phases thereof.

Surface active agents (surfactants) have long been used as water additives to waterflood systems. The function of the surfactants is to increase the viscosity of the displacing fluid and to reduce the surface tension between the displacing fluid and the reservoir rock. The present invention is primarily concerned with the viscosifying effect of the surfactant on the displacing fluid.

Solubility in water is a necessary characteristic for some surfactants to alter the internal bulk properties such as viscosity of the solution. It has been found that solubilization effects promoted by the blend of interrelated surfactants have a pronounced effect on water viscosity. The viscosity-concentration curve for blends of interrelated surfactants demonstrates a minimum viscosity at the concentration at which the water and the insoluble component is solubilized. This phenomenon finds application in controlling the mobility of the untreated water following the surfactant bank. Briefly, the solubilization effects tend to heal fingers of untreated water projecting into the surfactant bank. Thus the frontal advancement of the untreated water is maintained at a constant rate thereby improving the displacement efficiency of the flood.

It has further been found that by following the surfactant bank with another bank containing a viscosifier, the sweep efficiency is further increased. The bank containing the viscosifier presents a fluid mobility intermediate that of the surfactant bank and the untreated water thereby offering a gradation between the mobility of the bank and the relatively high mobility of the water.

An object of this invention then is to improve the displacement efficiency of a waterflood system. Another object is to provide a mobility control between the displacing and the displaced fluids. These and other objects will become apparent to those skilled in the art from the following disclosure taken in conjunction with the attached drawings in which.

Figure 1:
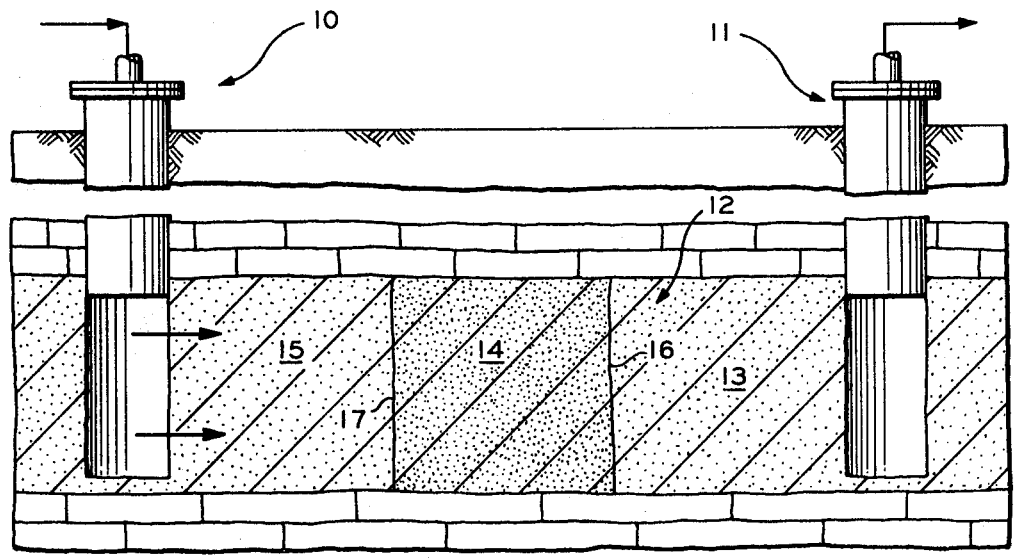
FIG. 1 is a diagrammatic illustration of a waterflood system performed according to this invention.

With reference to FIG. 1, the typical flood system includes a water injection well 10, a producing well 11 and an interconnecting, pressure communicating, oil-bearing formation or reservoir 12. For convenience of illustration a linear flood system is shown but it should be understood that in practice, the flow geometries are nonlinear and will depend on the flood pattern which may be according to the conventional five-spot pattern.

Figure 3:
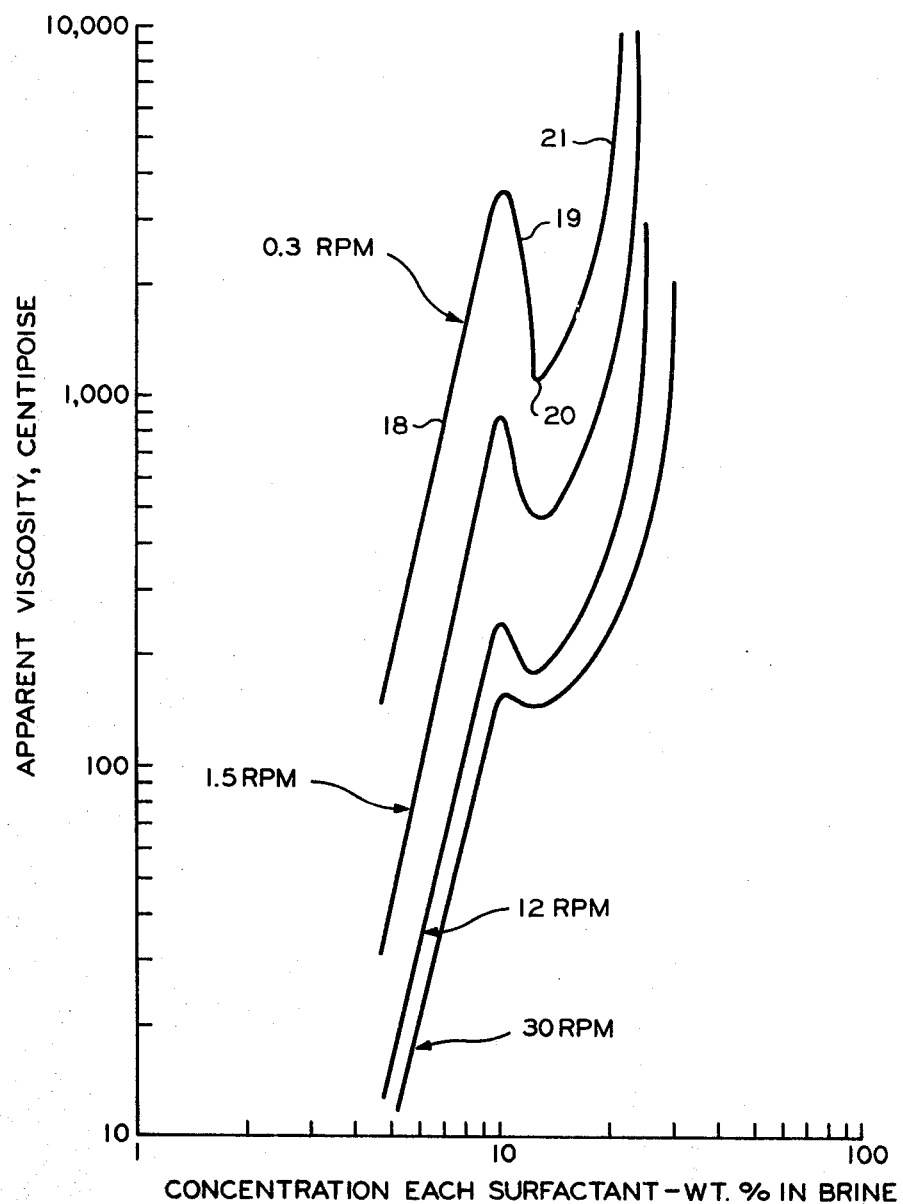
FIG. 3 is a viscosity-concentration graph illustrating the solubilization effects on fluid viscosity.

One embodiment of this invention contemplates the injection of a slug or bank of an aqueous solution containing two interrelated surfactants which demonstrate the solubilization effect graphical illustrated in FIG. 3, followed by untreated water phase. The term "untreated water" refers to water without surfactants but, in fact, may be treated with other additives such as salt to provide a salinity approaching that of the connate water of the reservoir. This, or course, is to prevent the hydration of formation clays.

Ideally the flood front (denoted 16) should advance uniformly through the formation 12 to obtain maximum displacement or sweep efficiency The uniform rate of advancement is determined to a great extent on the mobility ratio of the displacing to the displaced fluids. Thus, an intermediate stage of the flooding process may be represented as having successively an oil zone 13, a surfactant bank 14, and untreated water zone 15 from input well 10 to producing well 11 (see FIG. 1). The leading wall 16 of bank 14 represents the flood front. Now as untreated water is injected continuously, into input well 10, the bank 14 is driven through the reservoir 12 toward producing well 11 displacing oil in zone 13 ahead of front 16. One of the functions of the surfactants is to increase the viscosity of the displacing medium thereby providing for a favorable mobility ratio. The relative permeability of the oil at high saturation also tends to improve the mobility ratio. However, at the untreated water front (denoted 17) the mobility ratio will be unfavorable because of the high viscosity of the surfactant bank and the low viscosity of the untreated water. In fact, the mobility ratio is worse between these two zones than it would have been without the surfactant bank because the relative permeability of the water does not have the effect of improving the mobility ratio. Consequently, fingers of the untreated water will tend to advance into the surfactant bank 14 ahead of front 17. The present invention provides for interrelated surfactants to be blended in the aqueous solution making up the surfactant bank 14 at a particular concentration so that the solubilization effect comes into play when the concentration is disturbed.

While a variety of surfactants are available which demonstrate the solubilization effect, the present invention is described using blends of ethylene oxide adducts of alkyl phenols having the following general formula:

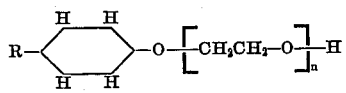

where R is an octyl radical ($C_8H_{17}$) or nonyl radical ($C_9H_{19}$) and $n$ varies with the component of the mixture of the invention.

According to this invention at least one component of the mixture employs an adduct within the scope of the above-disclosed formula wherein the value to $n$ is in the range of 2.0 to 10, preferably 4.5 to 9.5, still more preferably 6 to 6.5; and at least one other component in the mixture employs an adduct within the scope of the above-disclosed formula wherein $n$ has a value in the range from 30 to 200, preferably 80 to 100, still more preferably a value of 100. The preferred ranges of 4.5 to 9.5 and 6 to 9, together with the preferred range of 30 to 100, for at least two adducts of the mixture of this invention are preferred, especially in combination with each other because the best results are obtained with the combination of these limited ranges, especially when the minimum $n$ value of 6 for one adduct is combined with an adduct of maximum $n$ value of 100.

The adducts used in the mixture of this invention are well known and readily available commercially. For example, ethylene oxide adducts of nonyl phenols having varying numbers of ethylene oxide units are available commercially under the Triton N series from the Rohm & Haas Company, Philadelphia, Pennsylvania, and also under the IGEPAL-CO series available from the General Aniline Film Corporation, Dystuff and Chemical Division, and also from Antara Chemicals. Also, ethylene oxide adducts of octyl phenols are available commercially under the Triton X Series of Rohm & Haas and the IGEPAL CA series of General Aniline Film Corporation. Also, these compounds are readily made by one skilled in the art with techniques well known in the art and therefore for the sake of brevity and clarity these known techniques will not be discussed.

The additive mixture of this invention is formed from at least one of the above adducts having an $n$ value in the range of 6 to L9 and at least one of the above adducts having an $n$ value in the range of 30 to 100, mixtures of two or more of each of these adducts presently being feasible. Generally, the amount of each adduct employed in the additive mixture will be only that which provides for the solubilization effect discussed below.

For purposes of demonstration, IGEPAL compounds having characteristics tabulated below were used:

|  | Average $n$ Value | R (radical) |
|---|---|---|
| IGEPAL CO 530 | 6–6.5 | $C_9H_{19}$- |
| IGEPAL CO 990 | 100 | $C_9H_{19}$- |

Equal weight portions of the two surfactants, IGEPAL CO 530 and IGEPAL CO 990, display in brine viscous properties not associated with solutions of either surfactant alone; namely, a viscosity minimum above or below which the mixture becomes more viscous. FIG. 3 illustrates the viscosity-concentration curve prepared from data tabulated below and obtained by the Brookfield Model LVT viscometer using a NO. 1 spindle and at 120° F.

| Speed (r.p.m.) | Wt % of Surfactant in Brine | | | | |
|---|---|---|---|---|---|
|  | 5 | 10 | 12.5 | 17.5 | 25 |
| 0.3 | <200 cp. | 3620 cp. | 1140 cp. | 1940 cp. | >20,000 cp. |
| 1.5 | 40 cp. | 856 cp. | 472 cp. | 768 cp. | >4,000 cp. |
| 12 | 15.0 cp. | 238 cp. | 183 cp. | 287 cp. | >500 cp. |
| 30 | 10.4 cp. | 158 cp. | 145 cp. | 189 cp. | >200 cp. |
| 60 | 8.9 cp. | >100 cp. | >100 cp. | >100 cp. | >100 cp. |

Considering the 0.3 r.p.m. curve, at low surfactant concentrations, the viscosity increases as denoted by numeral 18. This is due to the increase in concentration of the more soluble IGEPAL CO990. At a particular concentration, about 10 percent in this example, solubilization of the IGEPAL CO 530 occurs, causing the viscosity to decrease with increase in concentration (denoted curve portion 19). The curve reaches a minimum viscosity, denoted 20, at a concentration of about 12.5 percent. For concentration greater than about 12.5 percent, the viscosity increases (denoted curve portion 21). The increase in curve portion 21 is due to both the IGEPAL CO 530 and the IGEPAL CO 990 increasing in concentration, their effects on viscosity being additive. Now if the concentration of the surfactant blend is set at the minimum point indicated by 20, an increase or decrease in surfactant concentration will have the effect of increasing the viscosity of the bank 14. Thus, as fingers of the untreated water from brine zone 15 protrude into the surfactant bank 14, resulting in dilution in the bank, the drop in surfactant concentration causes an increase in viscosity thereby slowing down the advancement of the invading fingers. The effect of the surfactant blend then is to heal fingers invading the surfactant bank 14.

Figure 2:
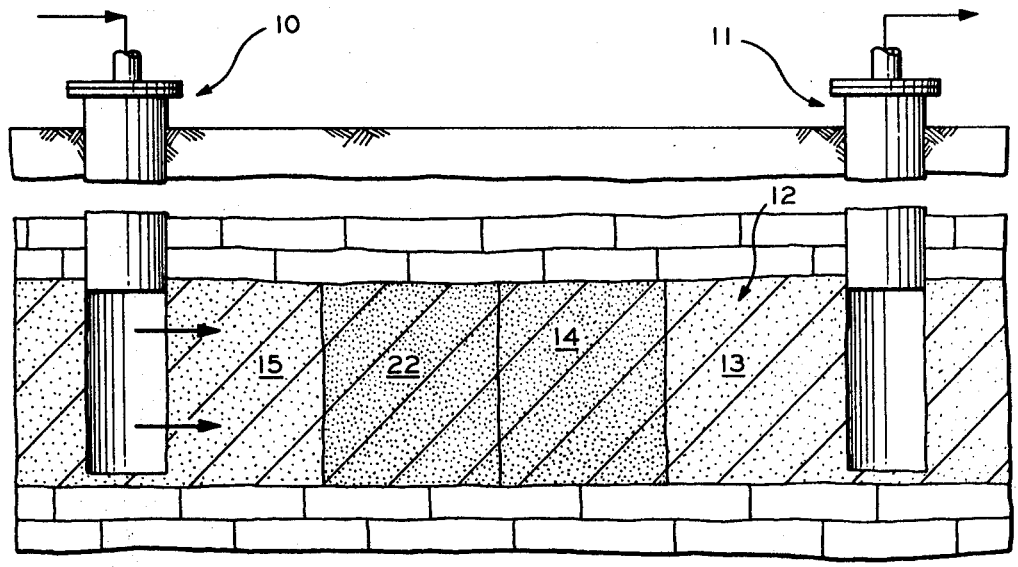
FIG. 2 is a diagrammatic illustration of another flood system performed according to this invention.

A second embodiment of the invention is shown in FIG. 2 wherein the bank 14 is followed by another bank 22 containing an aqueous viscosifier, such as a microbial gum polysaccharide or a partially hydrolyzed polyacrylamide. Polysaccharide has the following probable structure:

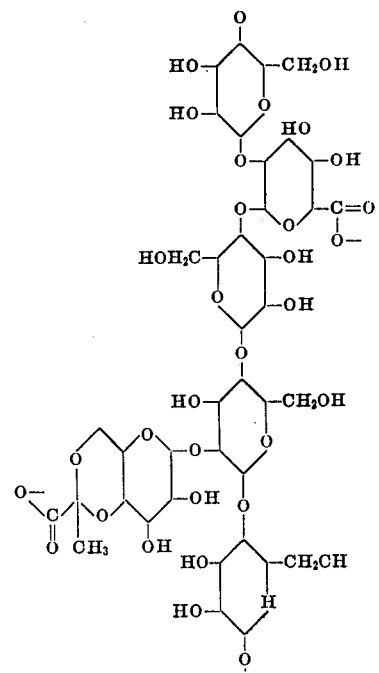

and is available commercially under the following product designations: Kelzan manufactured by Kelco Company, and Biopolymer XB–23 manufactured by General Mills. The partially hydrolyzed polyacrylamide has the following general structure:

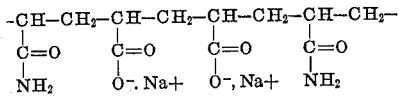

and is available commercially under the following product designation: Dow Pusher No. 531 manufactured by Dow Chemical Company; Polyhall M-295 manufactured by Stein-Hall & Company, Inc.; and Calgon Polymer 454 manufactured by Calgon Corporation. The effect of the viscosifier bank is to provide a zone of intermediate mobility between the surfactant bank 14 and the untreated water 15. Since the relative permeability to water at a given saturation will be generally the same for both the surfactant bank 15 and the viscosifier bank 22, the mobility ratio for the two is then the ratio of their viscosities. However, since the relative permeability to oil is not a factor, the mobility ratio of the surfactant bank 14 to the viscosifier bank 22 will be lower than that for the oil phase 13 to the surfactant bank 15. Since the untreated water has high mobility, the mobility ratio for untreated water phase 15 to the viscosifier bank 22 will be low. Thus, it is seen that an intermediate zone of relatively low mobility provides for a gradation in the mobility ratios through the system.

The size of each of the banks 14 and 22 must be adjusted to reservoir and prevailing economic conditions but should be around 0.1 of the reservoir pore volume for both embodiments.

As described above, the solubilization effect is provided by a mixture of IGEPAL CO 530 and IGEPAL CO 990, but it should be emphasized that other interrelated pairs of surfactants may be used with similar effects and results. Listed below are product designations of manufacturers of ethylene oxide adducts of alkyl phenols. Surfactant A has an $n$ value ranging from 2 to 10 and surfactant B has an $n$ value ranging from 30 to 200. The surfactants under "A" may be used interchangeably with the surfactants under "B".

| Surfactant A | | Surfactant B |
|---|---|---|
| Igepal CO-610 | | (Igepal CO-910 |
| Bridg 30 | with | (Igepal DM-970 |
| Siponic L-3 | | (Triton X-701 |
| Sterox SK, or | | ( |
| Sterox 6 | | ( |

It should be observed that the principles exemplified by this invention are applicable to secondary recovery or tertiary recovery systems.

EXAMPLE I

A 6-foot long, ¾-inch I.D., Schedule 80 iron pipe was filled with sand obtained from an outcrop of the Nacatoch sand. Standard pipe caps at either end were drilled and tapped to accommodate the transition to ⅛-inch plastic tubing. Reservoir temperature was maintained by an 8-foot heater tape wrapped directly around the pipe and insulated by several layers of asbestos tape. The sand was saturated with Smackover filed crude oil. The tube was then flooded with simulated Smachover field brine at a constant injection rate of 1 milliliter per minute until a water-oil ratio of 100 was reached. Additive injection was then begun at the same rate. Initially about one pore volume of an aqueous solution containing surfactants was injected. The aqueous solution consisted of: the simulated brine and equal weight per cents of IGEPAL CO 990 and IGEPAL CO 530, the total additive being about 25 weight percent of the brine. The surfactant slug was followed by continuous injection of untreated brine at the same rate. Injection was continued until the incremental oil recovery returned to the preadditive treatment level. The injection volumes and withdrawal volumes were determined by conventional methods. Saturations were determined by volumetric calculations. The following table summarizes the experiment:

| | Tube | | |
|---|---|---|---|
| | No. 1 | No. 2 | No. 3 |
| Aqueous solution: | | | |
| Additives, weight percent in brine: | | | |
| IGEPAL CO 990 | 12.5 | 12.5 | 12.5 |
| IGEPAL CO 530 | 12.5 | 12.5 | 12.5 |
| Total additive | 25.0 | 25.0 | 25.0 |
| Oil saturation after waterflood percent of reservoir pore volume (P.V.) | 44.3 | 46.4 | 51.1 |
| Total aqueous solution injected, pore volume | 0.50 | 0.25 | 0.25 |
| Total injection of aqueous solution and brine at aqueous solution breakthrough (P.V.) | 0.83 | 0.64 | 0.80 |
| Total injection of aqueous solution and brine (P.V.) | 1.88 | 1.00 | 1.63 |
| Oil saturation after injection of aqueous solution and brine (percent of P.V.) | 10.0 | 28.3 | 8.6 |
| Incremental oil (P.V.) | 34.3 | 18.1 | 42.5 |

Tubes 1 and 2 represent the flooding of a reservoir according to the first embodiment of this invention wherein the surfactant bank (aqueous solution) was followed by brine.

As indicated by the incremental oil data, flooding according to the present invention substantially increases recoverable oil from a formation.

EXAMPLE II

Using the apparatus as described in Example I, after the waterflooding and the injection of the surfactant bank, a slug containing 0.5 weight per cent of a viscosifier (Kelzan) in brine was injected followed by the continuous injection of brine. The injection rates remained constant. Tube 3 represents the flooding of the reservoir according to this experiment and the second embodiment of this invention. As indicated, the addition of the viscosifier slug greatly increased recovery from the reservoir.

As reflected by the above tests (tubes 1, 2) the incremental oil recovery attributed to the additive flood decreases as the pore volume of the surfactant slug decreases. However, by following the surfactant slug with a slug of viscosifier solution the incremental oil is markedly increased.

Reasonable variations and modifications are possible within the scope of this disclosure without departing from the scope and spirit of the invention as set forth in the appended claims.

I claim:

1. In a method for recovering oil from a formation by injecting an aqueous liquid into that formation so as to displace oil from said formation and producing the displaced oil through a wellbore penetrating said formation; the improvement comprising incorporating into that formation an aqueous mixture of two surface active agents, wherein said surface active agents are selected from the class consisting of ethylene oxide adducts of alkyl phenols having the formula

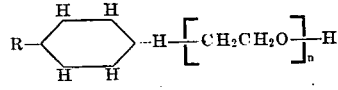

wherein R is one of octyl and nonyl radicals, wherein the first of said surface active agents has an $n$ value of from 6.0 to 6.5 and wherein the second of said surface active agents has an $n$ value of 100 said first surface active agent having a low solubility in said aqueous liquid, said second surface active agent having a high solubility in said aqueous liquid, said second surface active agent also being a solubilizing agent for said first surface active agent, said first and second surface active agents being present in equal weight amounts and wherein the concentration of each of said two surface active agents in said aqueous mixture is in the range of 10 to 12.5 weight per cent.

2. The method as recited in claim 1 wherein the concentration of each of said surface active agents in said aqueous mixture is 12.5 weight per cent based on the total weight of the aqueous liquid.

3. The method of claim 1 wherein a predetermined amount of said aqueous liquid containing said mixture is injected in said formation and further comprising injecting into said formation behind said predetermined amount of said aqueous liquid containing said mixture an aqueous liquid containing a viscosifying agent, the amount of said viscosifying agent being such to increase the viscosity of said aqueous liquid containing amounts thereof to at least equal the viscosity of said aqueous solution containing said mixture of surface active agents.

4. The method as recited in claim 3 wherein said viscosifying agent is selected from the group consisting of polysaccharides and partially hydrolyzed polyacrylamides.

5. The method as recited in claim 4 wherein a predetermined amount of said aqueous liquid containing said viscosifying agent is injected into said formation.

6. The method as recited in claim 5 wherein said predetermined volumes of said aqueous liquid containing said mixture of said surface active agents and said aqueous liquid containing said viscosifying agent both equal 0.1 pore volumes of said formation.

UNITED STATES PATENT OFFICE
CERTIFICATE OF CORRECTION

Patent No. 3,610,339          Dated October 5, 1971

Inventor(s) Robert R. Harvey

It is certified that error appears in the above-identified patent and that said Letters Patent are hereby corrected as shown below:

Column 6, lines 52 to 58, the formula should appear as shown below:

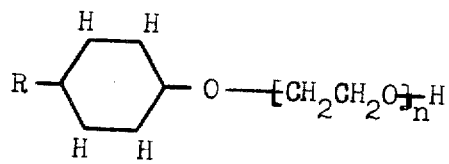

Signed and sealed this 18th day of April 1972.

(SEAL)
Attest:

EDWARD M. FLETCHER, JR.
Attesting Officer

ROBERT GOTTSCHALK
Commissioner of Patents